(12) United States Patent
Fahrenholz

(10) Patent No.: US 7,028,460 B1
(45) Date of Patent: Apr. 18, 2006

(54) ROCK WINDROWER

(75) Inventor: Harley D. Fahrenholz, P.O. Box 184, Miltona, MN (US) 56354

(73) Assignee: Harley D. Fahrenholz, Miltona, MN (US)

( * ) Notice: Subject to any disclaimer, the term of this patent is extended or adjusted under 35 U.S.C. 154(b) by 0 days.

(21) Appl. No.: 10/901,814

(22) Filed: Jul. 29, 2004

Related U.S. Application Data

(60) Provisional application No. 60/490,708, filed on Jul. 29, 2003.

(51) Int. Cl.
*A01D 43/02* (2006.01)
*A01D 87/00* (2006.01)

(52) U.S. Cl. .................................... 56/344; 171/63

(58) Field of Classification Search .......... 56/328.1, 56/377; 414/440, 439; 171/63, 144, 105, 171/86
See application file for complete search history.

(56) References Cited

U.S. PATENT DOCUMENTS

| | | | | |
|---|---|---|---|---|
| 1,189,016 A | * | 6/1916 | Thompson .................. 15/83 |
| 2,816,614 A | * | 12/1957 | Hier ........................ 171/63 |
| 2,817,405 A | * | 12/1957 | Pearson ..................... 171/63 |
| 3,593,868 A | * | 7/1971 | Folz ......................... 414/440 |
| 3,630,401 A | * | 12/1971 | Gustafson et al. ......... 414/440 |
| 3,722,722 A | * | 3/1973 | Blair ........................ 414/505 |
| 3,782,477 A | | 1/1974 | Fahrenholz ............... 171/12 |
| 4,167,975 A | | 9/1979 | Fahrenholz ............... 171/12 |
| 4,282,932 A | * | 8/1981 | Anderson ................. 171/63 |
| 4,315,546 A | | 2/1982 | Fahrenholz ............... 171/65 |
| 4,345,655 A | | 8/1982 | Fahrenholz ............... 171/63 |
| 4,878,802 A | * | 11/1989 | Hansen et al. ............ 414/523 |
| 5,147,100 A | * | 9/1992 | Frankel ..................... 294/19.2 |
| RE34,458 E | | 11/1993 | Fahrenholz ............... 241/74 |
| 6,044,579 A | * | 4/2000 | Hadler et al. ............. 37/234 |

* cited by examiner

*Primary Examiner*—Árpád Fábián Kovács
(74) *Attorney, Agent, or Firm*—Westman, Champlin & Kelly, P.A.

(57) ABSTRACT

A rock windrower has a pair of side blade members that are elongated at fore and aft directions and are positioned to be widely spaced at one end and tapering to a narrow spacing at an opposite end. Movement along the ground with the side blade members engaging or adjacent to the ground surface causes rocks that are engaged to be moved along the tapered V-shaped frame to form a windrow. The side members include cutting blades along the lower edges. A plurality of gauge wheels on the side blade members engage the ground and support the cutting blades at a desired orientation and level relative to the ground surface.

13 Claims, 4 Drawing Sheets

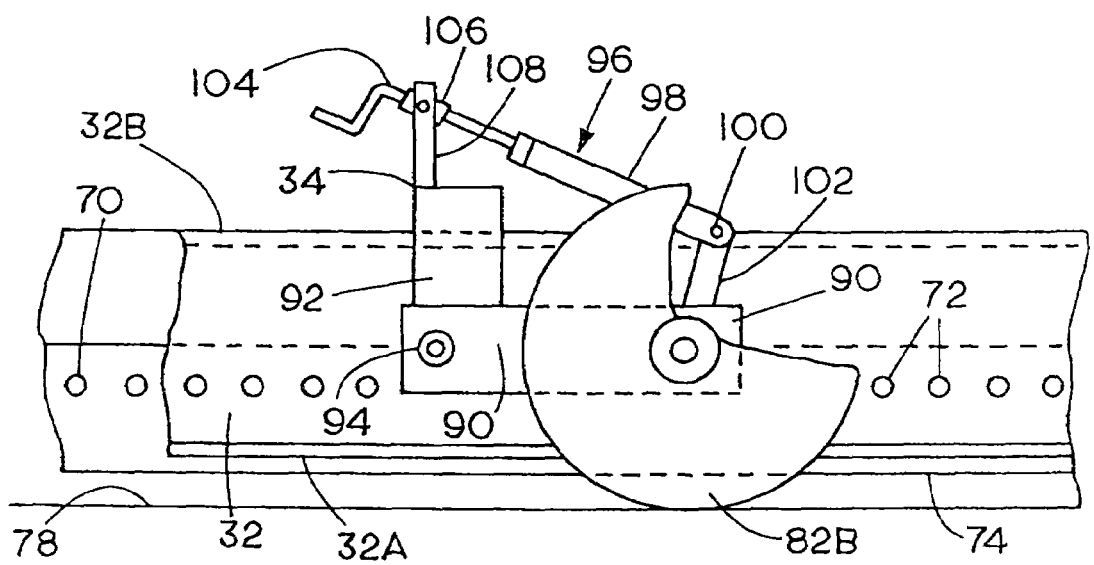
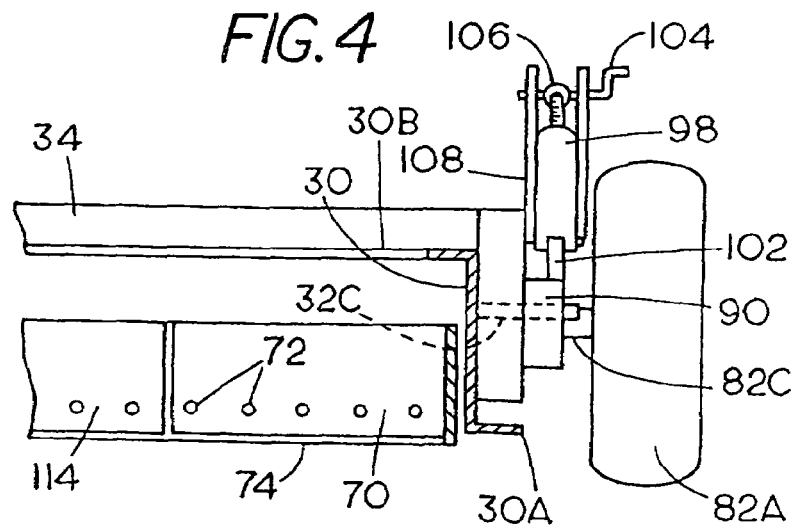

ROCK WINDROWER

This application refers to and claims priority from U.S. Provisional Application Ser. No. 60/490,708, filed Jul. 29, 2003, the content of which is incorporated by reference.

BACKGROUND OF THE INVENTION

The present invention relates to a non-rotating scraper or blade type rock windrower with scraper blades on a frame attachable to a tractor or other prime mover and shaped in a V configuration when viewed from the top. The scraper blades are elongated and have cutting edge blades spaced apart substantially at a leading end, which will move travel at the level of, or just below the surface of the ground, and will gather rocks and form them into windrows, preferably a narrower windrow at an outlet than the inlet end of the rock windrower.

In the past, various rotating roller rock windrowers have been advanced. They require a power input and drives for the rollers, and while the rotating roll rock windrowers work satisfactorily, including those shown in patents by the present inventor, the need for power transmission raises the cost.

SUMMARY OF THE INVENTION

The present invention relates to a rock windrower that utilizes stationary blades, preferably elongated frame blades with bolt on cutting edge members that can be hardened. The blades are slightly curved in cross-section, and held with supports that form the blades into a V with an inlet end and an outlet end. Preferably, and most commonly, the inlet end is wider than the outlet end. Windrowing can be done in an opposite direction, so that the rocks are moved outwardly along the outer surfaces of the blades if the narrow end is the leading end when moving.

The rock windrower elongated blades are held on support members and shaped into a V that has a selected angle for moving rocks from the inlet or leading end to the outlet or trailing end as the blades are moved with a work vehicle or prime mover, such as a tractor. The rocks are moved laterally as the blades are moved forward to form a windrow. In particular, a frame mounts the blades and is provided with a plurality of gauge wheels to regulate the depth of cut of the lower edge of the blades. As shown, four gauge wheels are used, but three gauge wheels would also work. The gauge wheels are important because they will maintain the lower blade edge at a desired level relative to the ground surface.

The lower blade edge member is a type of a cutting edge from road grader blades, which is a hardened steel, and generally is a curved cross-sectional configuration. The blade lower edge runs along or just under the surface of the ground and will engage and scrape rocks that are on the ground surface or slightly below the surface and loosen them, and then move them laterally. As shown, the rocks are moved to a narrow outlet at the rear of the blades in the form of a rock windrow. The blades are adjustable in height or depth of cut by utilizing adjustments on the gauge wheels that are provided to support the frame. The lower or cutting edge is kept relatively level with the surface of the ground by using front and rear gauge wheels on each side of the windrower.

The frame for the rock windrower can be mounted on a tractor, and as shown can be below the tractor frame. Also, separate transport or support wheels can be provided for a main frame of a prime mover or self-propelled work vehicle on which the windrower frame is mounted. Three point hitch adapters also can be used for holding the V-shaped blades, and supporting them as they are moved.

BRIEF DESCRIPTION OF THE DRAWINGS

FIG. 3 is a fragmentary side view taken generally along line 3—3 in FIG. 2;

FIG. 4 is a sectional view taken generally along line 4—4 in FIG. 1;

DETAILED DESCRIPTION OF THE PREFERRED EMBODIMENTS

Figure 1:
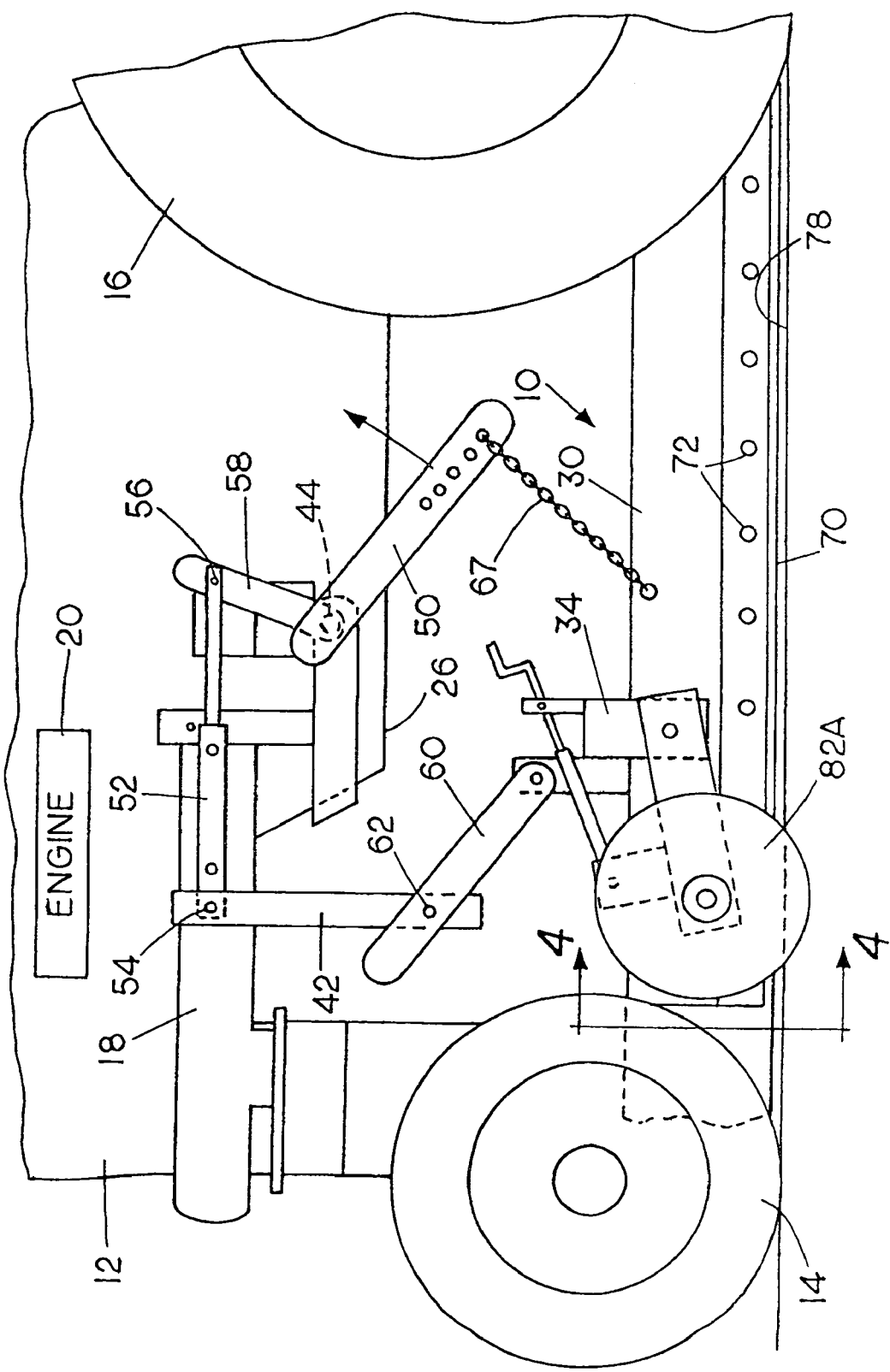
FIG. 1 is a schematic side-view of a rock windrower made according to the present invention, supported underneath the frame of a tractor, which is also shown schematically.
Figure 2:
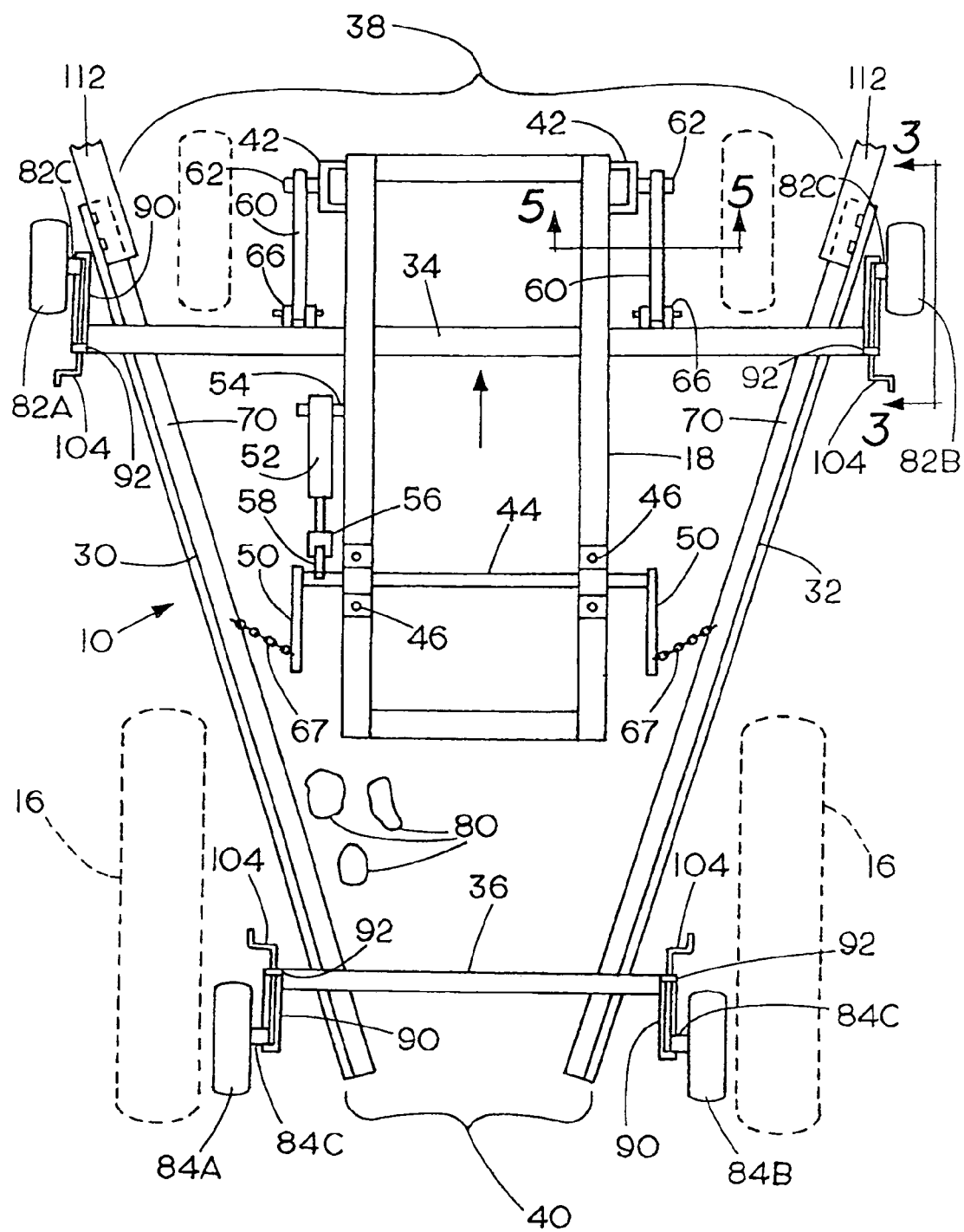
FIG. 2 is a top plan view of the rock windrow in FIG. 1, with the frame of a tractor shown schematically for illustrative purposes.

Referring to FIGS. 1 and 2, in particular, the rock windrower indicated generally at 10 is shown supported on a tractor schematically illustrated at 12. The tractor has front wheels 14 and rear drive wheels 16, in the form shown, and a tractor frame 18 on which the front and rear wheels 14 and 16 are mounted in a normal manner. An engine 20 is used for providing power, including hydraulic power. The rear wheels 16 are driven by the engine through a transmission. An operator seat is provided along with a steering wheel, which are standard and are not shown. The front wheels 14 are the steering wheels.

The tractor has relatively high clearance to the bottom edge 26 of the frame 18. The rock windrower 10, as shown, has a windrower frame assembly (see FIG. 2) that comprises a pair of longitudinally extending blade members or frames 30 and 32, respectively, forming opposite sides of the windrower. The blade members 30 and 32 are secured together with a front cross member 34, and a rear cross member 36. It can be seen that the longitudinal blade members 30 and 32 form a V with a wider inlet or leading end opening indicated by the bracket 38, and a narrow trailing or exit opening indicated by the bracket 40. The blade members 30 and 32 have hardened cutting or grader blades 70 attached at lower edges for engaging the ground.

The blade members 30 and 32 are essentially frame members for carrying the cutting edge blades 70. The blade members 30 and 32 can be used with other braces to tie them together as a unit. The cross members 34 and 36 are of suitable strength for the loads encountered. The cross members can be made of angle iron, channel iron or square, rectangular or round tubes, as desired, and bolted to brackets welded to the blade members.

Figure 5:
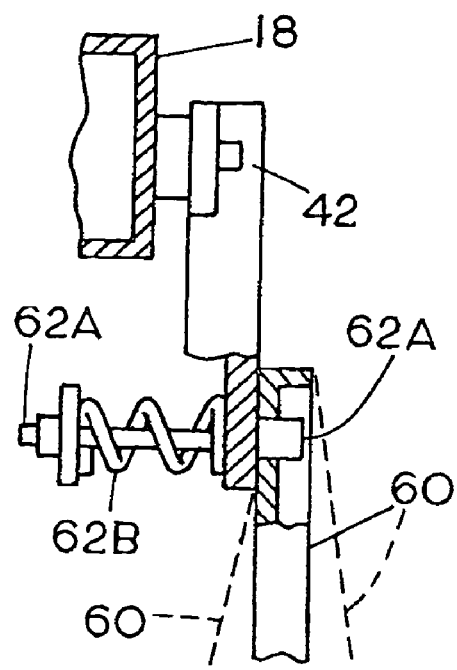
FIG. 5 is a fragmentary sectional view taken along line 5—5 in FIG. 2 showing a flexing pivot connection that attaches to support arms to a tractor frame mounting.

The frame 18 of the tractor is also illustrated schematically in outline in FIG. 2, and it can be seen in FIGS. 1 and 2 that there are forward attachment brackets 42 securely attached to opposite sides of the frame 18 of the tractor. The brackets 40 depend or extend downwardly from the frame 18. The forward brackets 42 are also shown in FIG. 5 schematically.

The frame 18 of the tractor also has a torque tube or cross tube 44 pivotally mounted thereon, on suitable bearings or bushings indicated generally at 46 in FIG. 2. The bearings or bushings 46 are attached to the frame 18.

The cross tube or torque tube 44 is a rotating or pivoting tube that has arms 50 fixed at the opposite ends thereof, on the outside of the tractor frame 18. A suitable hydraulic actuator 52 has its base end attached to the tractor frame 18 as shown at 54, on a suitable bracket, and has a rod end 56 that operates a lever arm 58 that is fixed to the torque tube or cross tube 44. The lever arm 58 is of sufficient length so that it will permit raising and lowering the outer ends of the arms 50 on the tube 44 sufficiently for raising and lowering the rock windrower blade members 30 and 32 at a selected location.

The blades 30 and 32 are raised by also having front pivoting support links 60 on opposite sides of the tractor, mounted on brackets 42, as at pivot point 62. The rear ends of the links 60 are pivotally mounted as at 64 to the cross member 34 using suitable brackets 66 that are upright and secured to the front side of cross member 34.

The lift arms 50, which are operated with cylinder 52 so that the outer ends of the arms 50 are raised and lowered by pivoting the torque tube, have their outer ends connected with suitable flexible links, as shown, chain links 67 to the respective one of the blade members 30 and 32.

The pivot 62 is a spring loaded or flexible connection, as shown in FIG. 5 that will permit some sideways movement of the blade members 30 and 32. The pivot 62 is formed with a bolt 62A that extends through both the arm 60 and frame member 42. A heavy compression spring 62B is mounted on the bolt 62A and a washer is used to compress the spring 62B. The spring 62B holds the pivot bolt and link 60 in place, but will permit some side to side movement of the links 60. This permits some side to side movement of the rock windrower blades 30 and 32 as the windrower is moved across the ground.

When the arms 50 are raised by operating the hydraulic cylinder or actuator 52, the outer end of lever arm 50 will pull on the chains or links 67 and will also create a moment that causes the link 66 to pivot up and raise the ends of frame members 30 and 32. Because of the orientation of the links 67, which extend forwardly, the lifting action will swing the links 60 upwardly about pivots 62 and this will in turn raise the forward ends of the frame members 30 and 32. Thus, the full length of the rock windrower blades will be lifted off the ground.

Referring to FIGS. 3 and 4 in particular, it can be seen for example that the blade member 30, that is shown and it is as typical of blade member 32 as well, is a "Z" shape that has a bottom flange 30A and a top flange 30B. The lower end of the vertical web 30C of each of the Z-shaped blade member has a ground cutting blade 70 attached thereto with suitable bolts indicated at 72. The ground cutting blade 70 has a lower edge 74 below the lower flange 30A of the blade member 30. It can be seen that the cutting blade 70 is generally curved in cross-sectional shape so that it is concave with the cutting edge 74 extending inwardly (toward the center with the V-shape used as shown) from the plane of the vertical web 30C a selected distance. The blade member 32 also has a grader cutting blade 70 attached thereto.

There is a blade member on each side of the rock windrower, with a cutting blade attached to the respective blade members 30 and 32, and the cutting blades will run at or slightly below the ground surface 78, so that the blades will scrape rocks shown schematically in FIG. 2 at 80 inwardly toward the center line or center plane of the rock windrower. The rocks will be discharged in a windrow through the outlet opening shown at bracket 40.

In order to make this fixed blade (non-rotating) rock windrower operate satisfactorily, gauge wheels indicated generally at 82A and 82B are mounted at the front of the rock windrower 10, and gauge wheels 84A and 84B are mounted at the rear or near the outlet narrow end of the rock windrower.

The gauge wheels 82A and 82B have suitable pneumatic tires and wheels mounted on axles 82C, and axles 84C are provided for the gauge wheels 84A and 84B.

The gauge wheel axles are mounted on suitable movable supports for raising and lowering, such as pivoting arms shown typically for the gauge wheels. Direct acting jacks and hydraulic cylinders can be used, as well as various sliding connections that can be bolted together.

A typical mounting which is provided for the gauge wheels is shown in FIG. 3. In FIG. 3, the axle 84C (or 82C) is mounted onto a support arm 90 that is pivoted about a horizontal axis on a vertical frame member 92 with a suitable strength pivot 94 at one end of the arm 90. A threaded extendable and retractable jack 96 has an outer housing 98 that is pivoted as at 100 on the upper end of a lever 102 fixed to the outer end of arm 90. A threaded crank 104 is threaded into the housing 98 and is rotatably supported at a reacting swivel connection 106 pivoted on a bracket 108 secured to the member 92. The crank 104 and swivel 106 will support the load from the gauge wheel. The crank 104 can be turned so the jack is adjusted in length so that it provides a changeable length threaded connection to the arm 90 for raising and lowering the gauge wheel about pivot 94. The threaded jack 96 can be replaced with a hydraulic jack, if desired, for power operation.

The use of gauge wheels is relatively well-known in other applications and any suitable adjustment for vertically adjusting the gauge wheels relative to the blade members 30 and 32 can be used.

Again, it should be noted that the present showing has a wide inlet end and a narrow outlet end for the rock windrower, but a windrow can be formed by reversing the direction of movement, so that the narrow end was leading and there would be a windrow of rocks formed on each outer side of the V-shape at the wide end and on the outside of the grader blades. The cutting blades 70 would be changed in orientation from that shown, so they would be on the outside of the blade members 30 and 32, and would engage the ground and move the rocks outwardly from the center line of the windrower as the blades were moved forwardly. A second pass of a rock windrower suitably laterally offset would move the rocks from two sides of the rock windrower into one windrow.

The frame for the rock windrower can be mounted onto a three point hitch of a tractor in a known manner so it can be raised or lowered with the hitch. It also can be supported independently on wheels on a frame that would replace the tractor frame, so the windrower frame could be lifted and lowered. The frame could be towed like a trailer. The gauge wheels would still maintain the depth of the cutting blades when the rock windrower is being used.

The cutting blades 70 are generally high strength hardened steel, and will stand a substantial amount of wear. They are also standard part members for road graders, so they are readily available.

The cross members for the rock windrower can be strengthened, and can be lengthened, to adequately support the blade members 30 and 32 in their tapered or V-shaped configuration.

Figure 6:
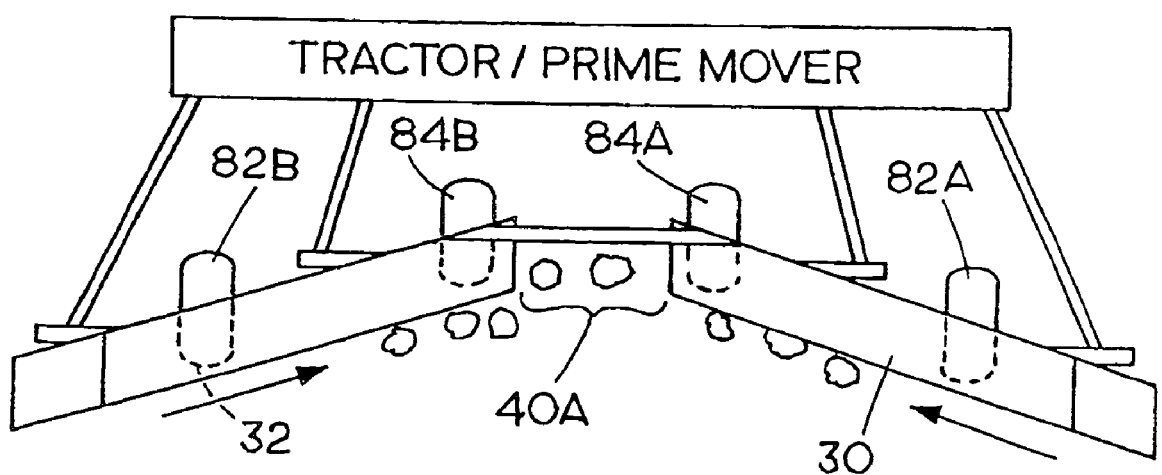
FIG. 6 is an illustrative top front perspective view of a V-shaped rock windrower with the portions of the gauge wheels illustrated.

The length of the blades 30 and 32 can be adjusted by splicing in additional lengths of grader blades and the side frame members, as desired. A schematic showing in FIGS. 1 and 6 illustrates an additional length grader blade 112 bolted to grader blades 70 and to blade members 30 and 32 to increases the width inlet end 38. A second section 114 of a grader blade is also shown in FIG. 4. In a typical application, the width at the wide end of the blade members of the rock windrower frame would be spaced approximately 8–10 feet apart, and at the narrow end, the frame members would be less than two feet apart, for example, about 20 inches.

The blade members can be from 8 feet to 10 feet long. The blade member can be 10 inches or so high. The forward speed ranges from just a crawl to 10 mph or more. Rocks up to 12 inches in diameter can be moved.

The upper and lower flanges on the blade members 30 and 32 provide rigidity and also the lower flanges 30A and 32A can slide along the ground and aid in guiding the grader blade. The grader blades can be attached in any desired manner, and can be directly supported on the support frame 18, if desired.

FIG. 6 is a schematic view to show the V-shape from the front and also to show the position of the gauge wheels. Many different types of frames and lifts can be used. Vertical adjustments of the gauge which also can be various types.

Although the present invention has been described with reference to preferred embodiments, workers skilled in the art will recognize that changes may be made in form and detail without departing from the spirit and scope of the invention.

What is claimed is:

1. A rock windrower having a pair of side blade members positioned spaced apart a selected first distance at a first end, and at a second end the side blade members being spaced a substantially less second distance to form a general V-shape configuration in plan view, lower edges of said side blade members being at a level relative to a ground surface that is selected to move rocks along the V-shape as the rock windrower is moved forwardly, and a plurality of gauge wheels mounted onto the side blade members for maintaining the lower edges at the level relative to the ground surface to engage rocks on the ground as the rock windrower is moved along the ground, each of the plurality of gauge wheels being mounted on a pivoting arm pivotally mounted relative to the side blade members at a pivot connection, respectively, and an actuator for controlling the position of the pivoting arms about the pivot connections relative to the respective side blade members to change the position of the lower edges relative to the ground.

2. A rock windrower having a support frame, and having a pair of side blade members positioned spaced apart a selected first distance at a first end, and at a second end the side blade member being spaced a substantially less second distance to form a general V-shape configuration in plan view, lower edges of said side blade members being at a level relative to a ground surface that is selected to move rocks along the V-shape as the rock windrower is moved forwardly, a plurality of gauge wheels mounted onto the side blade members for maintaining the lower edges at a level relative to the ground surface to engage rocks on the ground as the rock windrower is moved along the ground, and a linkage between the side blade members and the support frame for raising and lowering the side blade members relative to the ground independently of the gauge wheels.

3. The rock windrower of claim 1, wherein the plurality of gauge wheels comprise at least four wheels, two on each of the side blade members, and spaced apart in fore and aft direction.

4. The rock windrower of claim 1, wherein the first end of the rock windrower is a leading end in direction of movement of the rock windrower.

5. The rock windrower of claim 4, wherein the first distance is substantially in the range of 6 to 10 feet.

6. The rock windrower of claim 4, wherein the second distance comprises substantially 2 feet.

7. The rock windrower of claim 1, wherein said side blade members have cutting edge members at the lower edges thereof for engaging the ground.

8. The rock windrower of claim 1, wherein said side blade members are held together with cross members extending between and fixed to the side blade members.

9. The rock windrower of claim 1, wherein the side blade members are supported on a prime mover, the prime mover having a frame that overlies the side blade members, and a lift member on the prime mover for lifting and lowering the side blade members relative to the frame of the prime mover.

10. The rock windrower of claim 9, wherein the side blade members extend substantially 10 feet in length.

11. The rock windrower of claim 9, wherein there are a plurality of support members for supporting the side blade members relative to the frame, the support members permitting limited side to side movement of the side blade members relative to the frame.

12. A rock windrower adapted to be moved longitudinally in a first direction, said rock windrower having a support frame and a rock windrower assembly comprising cross members, and side blade members that are mounted to the cross members, said side blade members being spaced apart a first distance adjacent a first end of the rock windrower frame, and the side blade members being spaced apart a second distance which is substantially less than the first distance adjacent a second end of the rock windrower, the side blade members being substantially upright and having lower edges that engage and move material on the ground laterally along the side blade members, and support gauge wheels mounted on the side blade members as the rock windrower moves forward, respectively, for supporting the side blade members on a ground surface with the lower edges of the side blade members at a selected relationship to the ground surface when supported on the gauge wheels, and a linkage between the support frame and the rock windrower assembly for raising and lowering the side blade members relative to the support frame.

13. The rock windrower of claim 12, wherein said gauge wheels are mounted on adjustable frames connected between the side blade members and the gauge wheels to permit changing the position of the gauge wheels relative to the side blade members.

\* \* \* \* \*